United States Patent
Minamino et al.

(10) Patent No.: US 10,710,812 B2
(45) Date of Patent: Jul. 14, 2020

(54) PHYSICAL DISTRIBUTION SYSTEM, PHYSICAL DISTRIBUTION METHOD AND PROGRAM

(71) Applicants: KABUSHIKI KAISHA TOSHIBA, Tokyo (JP); TOSHIBA INFRASTRUCTURE SYSTEMS & SOLUTIONS CORPORATION, Kanagawa (JP)

(72) Inventors: Yuhi Minamino, Kawasaki Kanagawa (JP); Takashi Hirayama, Yokohama Kanagawa (JP); Tetsuo Watanabe, Tokyo (JP); Hiroyoshi Sekine, Kawaguchi Saitama (JP)

(73) Assignees: KABUSHIKI KAISHA TOSHIBA, Tokyo (JP); TOSHIBA INFRASTRUCTURE SYSTEMS & SOLUTIONS CORP., Kanagawa (JP)

( * ) Notice: Subject to any disclaimer, the term of this patent is extended or adjusted under 35 U.S.C. 154(b) by 38 days.

(21) Appl. No.: 16/213,122

(22) Filed: Dec. 7, 2018

(65) Prior Publication Data
US 2019/0283975 A1 Sep. 19, 2019

(30) Foreign Application Priority Data
Mar. 14, 2018 (JP) .................................. 2018-047204

(51) Int. Cl.
*B65G 43/10* (2006.01)
*B65G 47/64* (2006.01)
(Continued)

(52) U.S. Cl.
CPC ................ *B65G 43/10* (2013.01); *B07C 3/08* (2013.01); *B07C 5/36* (2013.01); *B65G 47/493* (2013.01);
(Continued)

(58) Field of Classification Search
CPC ...... B65G 47/70; B65G 43/10; B65G 47/642; B65G 47/30; B65G 47/31; B65G 47/32;
(Continued)

(56) References Cited

U.S. PATENT DOCUMENTS 4,615,446 A * 10/1986 Pavie ........................ B07C 3/02
198/347.1
5,267,638 A * 12/1993 Doane ..................... B65G 43/08
198/357
(Continued)

FOREIGN PATENT DOCUMENTS

EP  1164096 A1 * 12/2001 ........... B65G 47/088
JP  2014-205527 A  10/2014
(Continued)

OTHER PUBLICATIONS

Extended European Search Report dated Aug. 1, 2019, filed in counterpart European Patent Application No. 19160025.3, 6 pages.

*Primary Examiner* — Mark A Deuble
(74) *Attorney, Agent, or Firm* — Kim & Stewart LLP

(57) ABSTRACT

A physical distribution system includes first and second conveyance paths, first and second sensors, and a processor. The first sensor detects a package passing along the first conveyance path. The second conveyance path merges with the first conveyance path at a junction. The second sensor detects a package passing along the second conveyance path. The processor counts a first number of packages present in a first convergence monitoring section determined in the first conveyance path upstream the junction, and counts a second number of packages present in a second convergence monitoring section determined in the second conveyance path upstream the junction, determines an order in which packages in the first and second convergence monitoring sections pass the junction, based on the first number and the second number, and control the first and
(Continued)

second conveyance paths, such that the packages pass the junction in the determined order.

20 Claims, 11 Drawing Sheets

(51) Int. Cl.
*B07C 5/36* (2006.01)
*B07C 3/08* (2006.01)
*B65G 47/68* (2006.01)
*B65G 47/49* (2006.01)
*B65G 47/51* (2006.01)
*B65G 47/70* (2006.01)
*B65G 47/30* (2006.01)

(52) U.S. Cl.
CPC ....... *B65G 47/5104* (2013.01); *B65G 47/642* (2013.01); *B65G 47/681* (2013.01); *B65G 47/70* (2013.01); *B65G 47/30* (2013.01)

(58) Field of Classification Search
CPC .. B65G 47/493; B65G 47/5104; B65G 47/68; B65G 47/681; B65G 47/69; B70C 5/36; B70C 3/08
See application file for complete search history.

(56) References Cited

U.S. PATENT DOCUMENTS

| 7,777,148 B2 * | 8/2010 | Zimmermann ........... B07C 3/06 |
| | | 209/584 |
| 10,065,215 B2 | 9/2018 | Berdelle-Hilge et al. |
| 2012/0222992 A1 | 9/2012 | Girodet et al. |
| 2018/0022555 A1 * | 1/2018 | Maines ................ B65G 47/684 |
| | | 198/370.02 |

FOREIGN PATENT DOCUMENTS

| WO | 2012022866 A1 | 2/2012 |
| WO | 2016026655 A1 | 2/2016 |

\* cited by examiner

PHYSICAL DISTRIBUTION SYSTEM, PHYSICAL DISTRIBUTION METHOD AND PROGRAM

CROSS-REFERENCE TO RELATED APPLICATION

This application is based upon and claims the benefit of priority from Japanese Patent Application No. 2018-047204, filed on, Mar. 14, 2018, the entire contents of which are incorporated herein by reference.

FIELD

Embodiments described herein relate generally to a physical distribution system, a physical distribution method, and a program.

BACKGROUND

A physical distribution system having a plurality of sorters has been studied. In such a physical distribution system, packages are sent from a plurality of infeeders having processing capacities equivalent to processing capacities of the sorters to each of the sorters. The physical distribution system puts packages from each of the infeeders to a certain sorter through branching or convergence.

In the related art, in the physical distribution system, stagnation of packages may occur at a junction or the like of a conveyance path.

DETAILED DESCRIPTION

Embodiments are directed to providing a physical distribution system that effectively causes packages from a plurality of conveyance paths to converge to one conveyance path.

In general, according to an embodiment, a physical distribution system includes a first conveyance path, a first sensor, a second conveyance path, a second sensor, and a processor. The first sensor detects a package passing along the first conveyance path. The second conveyance path merges with the first conveyance path at a first junction. The second sensor detects a package passing along the second conveyance path. The processor counts a first number of packages present in a first convergence monitoring section determined in the first conveyance path upstream the first junction, and counts a second number of packages present in a second convergence monitoring section determined in the second conveyance path upstream the first junction, determines an order in which packages in the first and second convergence monitoring sections pass the first junction, based on the first number and the second number, and control the first and second conveyance paths, such that the packages pass the first junction in the determined order.

Hereinafter, an embodiment will be described in detail with reference to drawings.

The physical distribution system according to an embodiment includes two sorters. The physical distribution system sends packages from a plurality of infeeders to each of the sorters. The physical distribution system sends the packages to the sorter. The sorter conveys the packages by using a conveyance path. The sorter puts a package being conveyed, into a certain chute. That is, the physical distribution system throws the packages into chutes according to sorting destinations of the packages.

Figure 1:
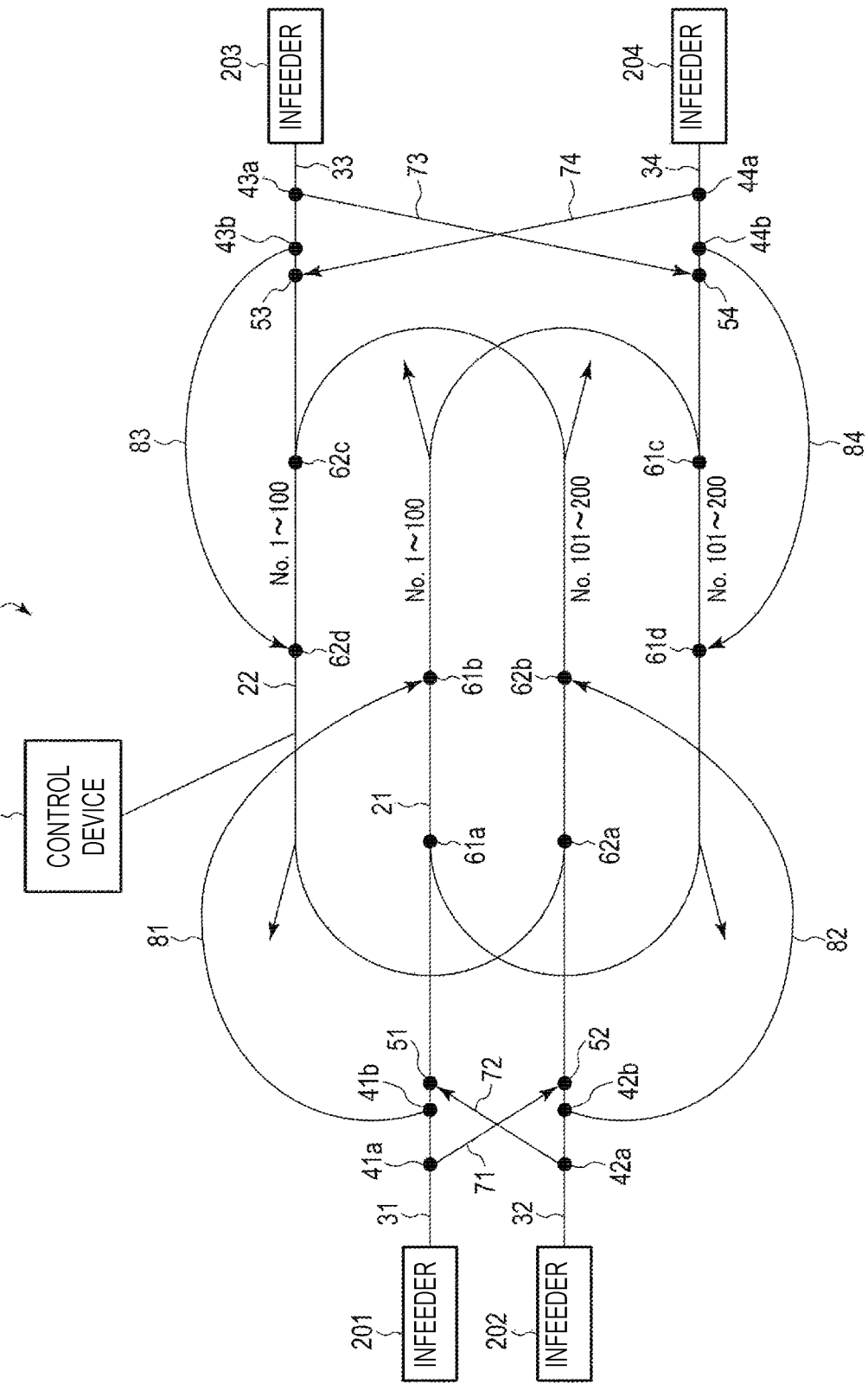
FIG. 1 is a diagram schematically illustrating a configuration example of a physical distribution system according to an embodiment.

FIG. 1 is a diagram illustrating a configuration example of a physical distribution system 1 according to an embodiment. The physical distribution system 1 includes a sorter 21 (first sorter) and a sorter 22 (second sorter).

The sorter 21 conveys a package to a predetermined chute. The sorter 21 includes a conveyance path and a plurality of chutes.

The conveyance path conveys a package in a predetermined route. Here, the conveyance path is formed in an oval shape. That is, the conveyance path is formed to convey the package in the oval route. The conveyance path of the sorter 21 is formed to convey the package in a clockwise direction. A tray on which a package is placed is conveyed along the conveyance path. On the tray, one package is loaded. That is, the conveyance path is employed to convey each tray on which one package is loaded.

The chutes are formed below the conveyance path. The respective chutes are formed to be aligned below the conveyance path. The chute is formed in a tubular shape. The chute is connected to an outlet portion such as a casing or a bag.

The tray has a structure in which a loaded package is droppable toward the chute. For example, the sorter 21 throws the package into the chute by opening the tray downwards.

For example, at a point in time a package is conveyed to a position above a predetermined chute, the sorter 21 throws the corresponding package into the corresponding chute by opening the tray of the corresponding package downwards.

It is assumed that the sorter 21 includes Nos. 1 to 100 chutes. The sorter 21 includes Nos. 1 to 100 chutes at the upper side and includes Nos. 101 to 200 chutes at the lower side. Here, the sorter 21 includes Nos. 1 to 200 chutes in order in a direction where packages are conveyed. That is, the sorter 21 includes No. 1 chute to No. 200 chute in order in a clockwise direction.

Like the sorter 21, the sorter 22 conveys a package to a predetermined chute. A conveyance path of the sorter 22 is formed to convey the package in a counterclockwise direction.

Like the sorter 21, the sorter 22 includes Nos. 1 to 200 chutes. Into each of the Nos. 1 to 200 chutes of the sorter 22, a package having the same sorting destination as a package to be thrown into each of the Nos. 1 to 200 chutes of the sorter 21 is thrown. That is, in the physical distribution system 1, a package to be thrown into a predetermined chute may be thrown into either the chute of the sorter 21 or the chute of the sorter 22.

The sorter 22 includes Nos. 1 to 100 chutes at the upper side and includes Nos. 101 to 200 chutes at the lower side. Here, the sorter 22 includes Nos. 200 to 1 chutes in order in a direction where packages are conveyed. That is, the sorter 22 includes No. 200 chute to No. 1 chute in order in a counterclockwise direction.

Other elements of the sorter 22 are the same as those of the sorter 21, and thus descriptions thereof will be omitted.

The physical distribution system 1 includes infeeders 201 to 204. The infeeder 201 feeds packages at a predetermined timing. For example, the infeeder 201 includes a robot arm and the like. The infeeder 201 takes out a package from a storage where packages are stored, and feeds the package, by using the robot arm. For example, the infeeder 201 feeds the packages at predetermined intervals.

The infeeders 202 to 204 are the same as the infeeder 201, and thus descriptions thereof will be omitted.

The physical distribution system 1 includes a conveyance path 31 (first conveyance path) between the infeeder 201 and the sorter 21.

The conveyance path 31 conveys a package fed by the infeeder 201 to the sorter 21. The conveyance path 31 is connected to the sorter 21 at a junction 61a (second junction). For example, the junction 61a is formed such that the package sent by the conveyance path 31 is conveyed to a position above the No. 1 chute.

For example, the conveyance path 31 includes a conveyance belt and a roller. At the conveyance path 31, the conveyance belt is driven by the roller rotating so as to convey the package loaded on the conveyance belt.

Here, it is assumed that the infeeder 201 side is an upstream, and the sorter 21 side is a downstream. This also applies to other conveyance paths.

The physical distribution system 1 includes a conveyance path 32 (third conveyance path) and a conveyance path 33 (sixth conveyance path) between the infeeders 202 and 203 and the sorter 22, respectively. The physical distribution system 1 includes a conveyance path 34 (fifth conveyance path) between the infeeder 204 and the sorter 21.

Each of the conveyance path 32 and the conveyance path 33 conveys a package fed by each of the infeeders 202 and 203 to the sorter 22.

The conveyance path 32 is connected to the sorter 22 at a junction 62a (third junction). For example, the junction 62a is formed such that the package sent along the conveyance path 32 is conveyed to a position above the No. 101 chute.

The conveyance path 33 is connected to the sorter 22 at a junction 62c (fifth junction). For example, the junction 62c is formed such that the package sent along the conveyance path 33 is conveyed to a position above the No. 1 chute.

The conveyance path 34 conveys a package fed by the infeeder 204 to the sorter 21. The conveyance path 34 is connected to the sorter 21 at a junction 61c (fourth junction). For example, the junction 61c is formed such that the package sent by the conveyance path 34 is conveyed to a position above the No. 101 chute.

The physical distribution system 1 includes a conveyance path 71 (fourth conveyance path) and a conveyance path 72 (second conveyance path) between the conveyance path 31 and the conveyance path 32. The conveyance path 71 is connected to the conveyance path 31 at a branch point 41a (first branch point). The conveyance path 71 is connected to the conveyance path 32 at a junction 52. The conveyance path 71 receives a package conveyed along the conveyance path 31, and the received package is sent to the conveyance path 32.

The conveyance path 72 is connected to the conveyance path 32 at a branch point 42a (second branch point). The conveyance path 72 is connected to the conveyance path 31 at a junction 51 (first junction). The conveyance path 72 receives a package conveyed by the conveyance path 32, and the received package is sent to the conveyance path 31.

Here, the branch point 41a is formed closer to the infeeder 201 side than the junction 51. That is, the branch point 41a is formed at the upstream of the junction 51. The branch point 42a is formed closer to the infeeder 202 side than the junction 52. That is, the branch point 42a is formed at the upstream of the junction 52.

The physical distribution system 1 includes a conveyance path 73 and a conveyance path 74, between the conveyance path 33 and the conveyance path 34. The conveyance path 73 is connected to the conveyance path 33 at a branch point 43a. The conveyance path 73 is connected to the conveyance path 34 at a junction 54. The conveyance path 73 receives a package conveyed by the conveyance path 33, and the received package is sent to the conveyance path 34.

The conveyance path 74 is connected to the conveyance path 34 at a branch point 44a. The conveyance path 74 is connected to the conveyance path 33 at a junction 53. The conveyance path 74 receives a package conveyed by the conveyance path 34, and the received package is sent to the conveyance path 33.

Here, the branch point 43a is formed closer to the infeeder 203 side than the junction 53. That is, the branch point 43a is formed at the upstream of the junction 53. The branch point 44a is formed closer to the infeeder 204 side than the junction 54. That is, the branch point 44a is formed at the upstream of the junction 54.

The physical distribution system 1 includes a conveyance path 81 (seventh conveyance path) between the conveyance path 31 and the sorter 21. The conveyance path 81 receives a package conveyed by the conveyance path 31 and sends the package to the sorter 21. The conveyance path 81 is connected to the conveyance path 31 at a branch point 41b (third branch point). The branch point 41b is formed between the branch point 41a and the junction 51. That is, the conveyance path 81 is connected to the conveyance path 31 at the upstream of the junction 51.

The conveyance path 81 is connected to the sorter 21 at a junction 61b (sixth junction). The junction 61b is formed at a position different from the junction 61a. The junction 61b is formed in the middle of the Nos. 1 to 100 chutes of the sorter 21. That is, the junction 61b is formed between the No. 50 chute and the No. 51 chute of the sorter 21.

The physical distribution system 1 includes a conveyance path 82 between the conveyance path 32 and the sorter 22. The conveyance path 82 receives a package conveyed by the conveyance path 32 and sends the package to the sorter 22. The conveyance path 82 is connected to the conveyance path 32 at a branch point 42b. The branch point 42b is formed between the branch point 42a and the junction 52. That is, the conveyance path 82 is connected to the conveyance path 32 at the upstream of the junction 52.

The conveyance path 82 is connected to the sorter 22 at a junction 62b. The junction 62b is formed at a position different from the junction 62a. The junction 62b is formed in the middle of the Nos. 101 to 200 chutes of the sorter 22. That is, the junction 62b is formed between the No. 150 chute and the No. 151 chute of the sorter 22.

The physical distribution system 1 includes a conveyance path 83 between the conveyance path 33 and the sorter 22. The conveyance path 83 receives a package conveyed by the conveyance path 33, and the received package is sent to the sorter 22. The conveyance path 83 is connected to the conveyance path 33 at a branch point 43b. The branch point 43b is formed between the branch point 43a and the junction 53. That is, the conveyance path 83 is connected to the conveyance path 33 at the upstream of the junction 53.

The conveyance path 83 is connected to the sorter 22 at a junction 62d. The junction 62d is formed at a position different from the junction 62c. The junction 62d is formed in the middle of the Nos. 1 to 100 chutes of the sorter 22. That is, the junction 62d is formed between the No. 50 chute and the No. 51 chute of the sorter 22.

The physical distribution system 1 includes a conveyance path 84 between the conveyance path 34 and the sorter 21. The conveyance path 84 receives a package conveyed by the conveyance path 34, and the received package is sent to the sorter 21. The conveyance path 84 is connected to the conveyance path 34 at a branch point 44b. The branch point 44b is formed between the branch point 44a and the junction 54. That is, the conveyance path 84 is connected to the conveyance path 34 at the upstream of the junction 54.

The conveyance path 84 is connected to the sorter 21 at a junction 61d. The junction 61d is formed at a position different from the junction 61c. The junction 61d is formed in the middle of the Nos. 101 to 200 chutes of the sorter 21. That is, the junction 61d is formed between the No. 150 chute and the No. 151 chute of the sorter 21.

A branching unit that controls a conveyance path of a package is formed at the branch points 41 (41a and 41b) to the branch points 44 (44a and 44b). The branching unit branches a package to a conveyance path under a control from a control device 10. For example, the branching unit includes a valve and the like which controls a conveyance direction of a package.

The control device 10 controls the physical distribution system 1 as a whole. The control device 10 selects a conveyance path to which a package is to be conveyed, at the branch points 41 (41a and 41b) to 44 (44a and 44b). That is, the control device 10 determines to which conveyance path the package is to be conveyed, at each of the branch points 41 to 44.

The control device 10 controls a package to converge at the junctions 51 to 54, 61 (61a to 61d) and 62 (62a to 62d). That is, the control device 10 causes packages to converge on one conveyance path, from two merging conveyance paths.

The control device 10 may control operations of the conveyance paths 31 to 34, 71 to 74, and 81 to 84. For example, the control device 10 controls a driving speed or the like of the conveyance paths 31 to 34, 71 to 74, and 81 to 84.

The control device 10 may control operations of the sorters 21 and 22. For example, the control device 10 may control a speed at which the sorters 21 and 22 convey packages. The control device 10 may control operations of the sorters 21 and 22 when the sorters 21 and 22 drop packages to chutes.

The physical distribution system 1 may have a configuration according to necessity as well as the configuration illustrated in FIG. 1, or a specific configuration may be excluded from the physical distribution system 1.

Figure 2:
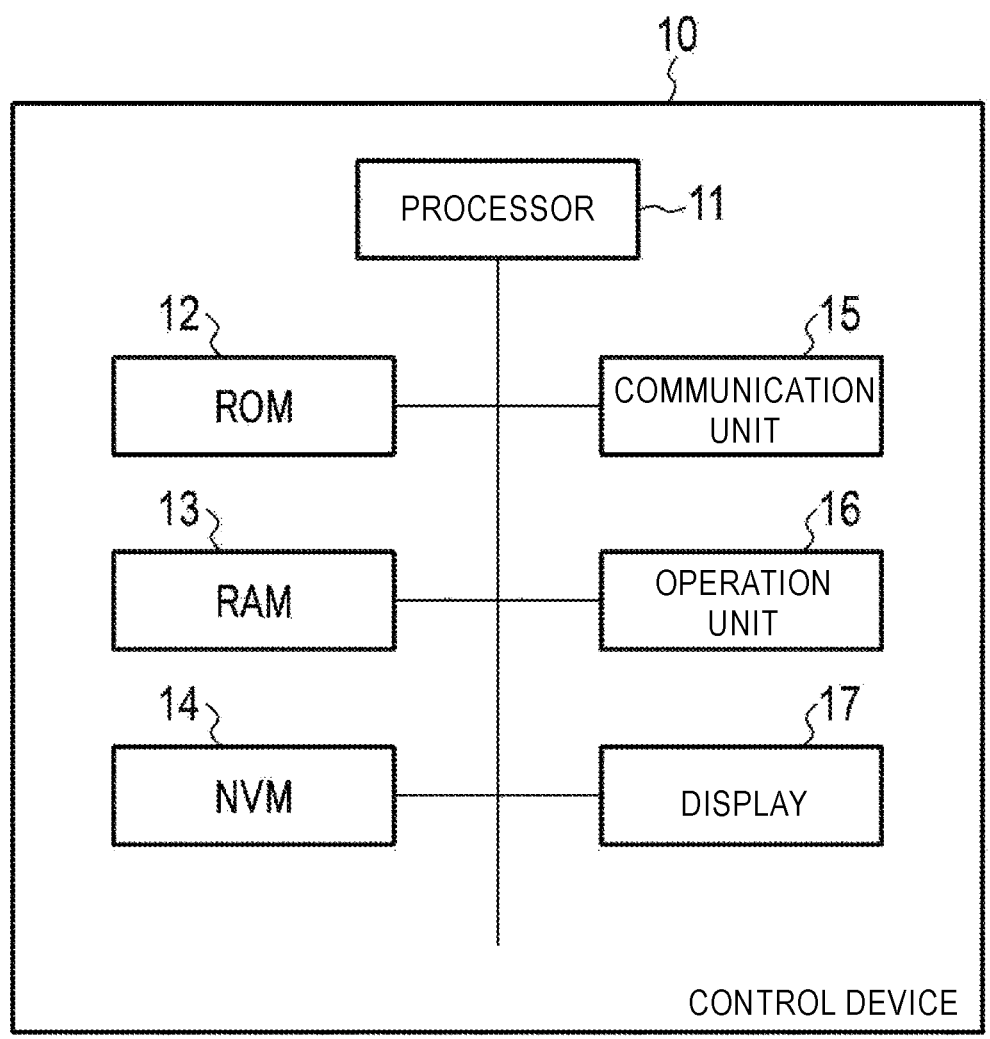
FIG. 2 is a block diagram illustrating a configuration example of a control device according to an embodiment.

Hereinafter, the control device 10 will be described. FIG. 2 is a block diagram illustrating a configuration example of the control device 10. In the configuration example illustrated in FIG. 2, the control device 10 includes a processor 11, a ROM 12, a RAM 13, an NVM 14, a communication unit 15, an operation unit 16, a display 17 and the like. These respective units are connected to each other via a data bus.

The control device 10 may have a configuration according to necessity as well as the configuration illustrated in FIG. 2, or a specific configuration may be excluded.

The processor 11 has a function of controlling the operation of the control device 10 as a whole. That is, the processor 11 controls the whole of the physical distribution system 1. The processor 11 may include an internal cache, various interfaces and the like. The processor 11 realizes various kinds of processing by executing programs that are stored in the internal cache, the ROM 12, or the NVM 14 in advance.

Apart of various functions performed when the processor 11 executes programs may be implemented by a hardware circuit. In this case, the processor 11 controls functions performed by the hardware circuit.

The ROM 12 is a non-volatile memory in which control programs, control data, and the like are stored in advance. The control programs and control data stored in the ROM 12 are incorporated in advance according to a specification of the control device 10. The ROM 12 stores, for example, a program (for example, BIOS) or the like that controls a circuit board of the control device 10.

The RAM 13 is a volatile memory. The RAM 13 temporarily stores data or the like being processed by the processor 11. The RAM 13 stores various application programs based on a command from the processor 11. The RAM 13 may store data required for executing the application programs, execution results of the application programs, and the like.

The NVM 14 is a non-volatile memory on which data is writable and re-writable. The NVM 14 includes, for example, a hard disk drive (HDD), a solid state drive (SSD), EEPROM (registered trademark), or a flash memory. The NVM 14 stores control programs, applications, various data or the like according to operational applications of the control device 10.

The communication unit 15 is an interface through which data is transmitted/received to/from respective units of the physical distribution system 1 via a predetermined communication network. The communication unit 15 is an interface that supports, for example, a LAN connection, a USB connection or the like.

The operation unit 16 accepts an input of various operations from an operator. The operation unit 16 transmits a signal indicating the accepted operation to the processor 11. For example, the operation unit 16 includes a keyboard, a ten key, and/or a touch panel.

The display 17 displays various kinds of information under a control by the processor 11. For example, the display 17 is implemented by a liquid crystal monitor. When the operation unit 16 is implemented by a touch panel or the like, the display 17 may be formed to be integrated with the operation unit 16.

Next, descriptions will be made on an operation example in which the physical distribution system 1 distributes packages at the branch point 41a and the branch point 42a.

Figure 3:
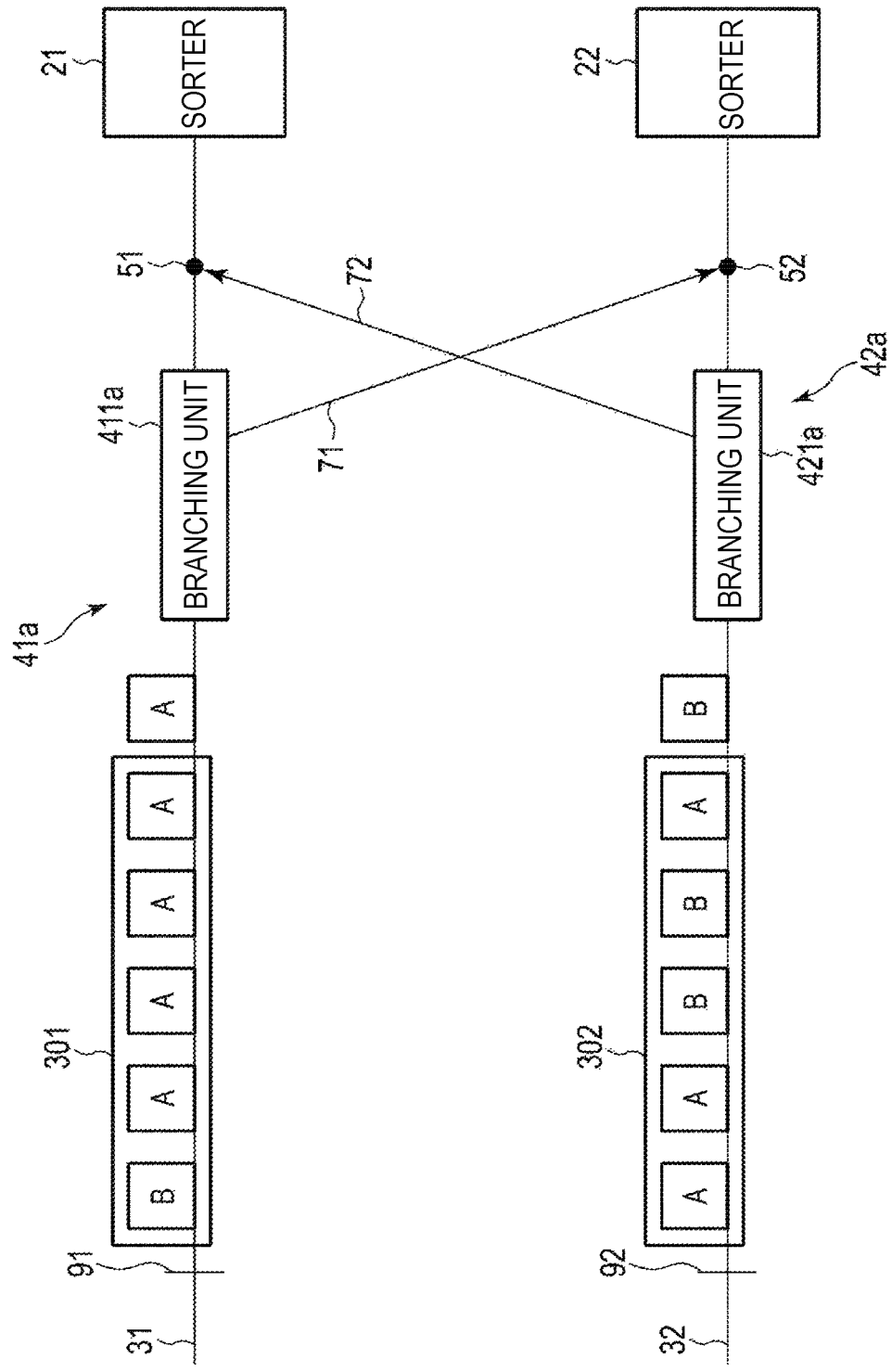
FIG. 3 is a diagram illustrating an operation example of a branch point in the physical distribution system according to an embodiment.

FIG. 3 is a diagram for explaining an operation example in which the physical distribution system 1 distributes packages at the branch point 41a and the branch point 42a.

As illustrated in FIG. 3, the physical distribution system 1 includes branching units 411a and 421a.

The branching unit 411a is formed at the branch point 41a. The branching unit 411a is formed on the conveyance path 31. The branching unit 411a is connected to the conveyance path 71. The branching unit 411a guides a package conveyed along the conveyance path 31 to the conveyance path 71 under a control by the processor 11.

For example, the branching unit 411a includes a valve that controls a conveyance direction of a package, a driving unit that drives the valve and the like. The branching unit 411a drives the valve under a control from the processor 11, so as to send the package on the conveyance path 31 to the conveyance path 71.

The branching unit 421a is formed at the branch point 42a. The branching unit 421a is formed on the conveyance path 32. The branching unit 421a is connected to the conveyance path 72. The branching unit 421a guides a package conveyed along the conveyance path 32 to the conveyance path 72 under a control by the processor 11. A configuration of the branching unit 421a is the same as that of the branching unit 411a and thus descriptions thereof will be omitted.

The physical distribution system 1 includes a sensor 91 (first sensor) and a sensor 92 (second sensor). The sensor 91 is formed on the conveyance path 31. The sensor 91 is formed at the upstream of the branching unit 411a. The sensor 91 detects a package passing through the conveyance path 31. That is, the sensor 91 detects a package passing through the conveyance path 31 or a package to pass through the conveyance path 71 from the conveyance path 31 via the branch point 41a. The sensor 91 is used to read a destination from a package conveyed by the conveyance path 31. That is, the sensor 91 is used to read a chute to which a package is to be conveyed. For example, the sensor 91 acquires information on a destination from a package.

Here, a package has a code indicating information on a destination. For example, the code is obtained by encoding the destination. The code may be obtained by encoding information by which the destination is specifiable. The code is a one-dimensional code, a two-dimensional code (for example, a QR Code®)), or the like.

The sensor 91 reads a code attached to a package. For example, the sensor 91 is implemented by a charge-coupled device (CCD) camera or the like. The sensor 91 transmits information obtained by decoding the read code, to the processor 11.

The sensor 92 is formed on the conveyance path 32. The sensor 92 is formed at the upstream of the branching unit 421a. The sensor 92 is used to read a destination from a package conveyed by the conveyance path 32. The sensor 92 detects a package passing through the conveyance path 32. That is, the sensor 92 detects a package passing through the conveyance path 32 or a package to pass through the conveyance path 72 from the conveyance path 32 via the branch point 42a. The configuration of the sensor 92 is the same as the configuration of the sensor 91, and thus descriptions thereof will be omitted.

Each of the sensor 91 and the sensor 92 may have a character recognition function of reading a character, or a symbol, which is a destination marked on a package. That is, each of the sensor 91 and the sensor 92 may not read a code attached to a package but may read a destination from a package conveyed by the conveyance path 32 through a character, or a symbol marked on the package.

Hereinafter, an operation example of the processor 11 will be described. A function performed by the processor 11 is performed when the processor 11 executes programs stored in the ROM 12 or the NVM 14.

First, the processor 11 has a function of specifying destinations of packages conveyed by the conveyance paths 31 and 32 by using the sensors 91 and 92.

The processor 11 reads a code of a package passing through the vicinity of the sensor 91 on the conveyance path 31 by using the sensor 91. Upon reading the code, the processor 11 specifies a destination (a chute number) of the package based on information obtained through reading.

For example, when the code is obtained by encoding a chute number, the processor 11 acquires information (the chute number) obtained by decoding the code, as a destination.

When the code is obtained by encoding information by which a destination can be specified, the processor 11 acquires a destination corresponding to the information obtained by decoding the code.

Likewise, the processor 11 reads a code of a package passing through the vicinity of the sensor 92 on the conveyance path 32 by using the sensor 92. Upon reading the code, the processor 11 specifies a destination (a chute number) of the package based on information obtained through reading.

The processor 11 has a function of specifying the number of packages to be sent to the sorter 21 and the number of packages to be sent to the sorter 22 based on a destination of each package.

That is, the processor 11 specifies the number of packages to converge at the junction 51 and the number of packages to converge at the junction 52 for a predetermined period.

Here, the processor 11, as a rule, sends packages of which destinations are the Nos. 1 to 100 chutes, to the sorter 21. The processor 11, as a rule, sends packages of which destinations are the Nos. 101 to 200 chutes to the sorter 22.

The processor 11 exceptionally sends packages of which destinations are the Nos. 1 to 100 chutes to the sorter 22. The processor 11 exceptionally sends packages of which destinations are the Nos. 101 to 200 chutes to the sorter 21.

The processor 11 determines a first branch monitoring section 301 and a second branch monitoring section 302.

The first branch monitoring section 301 is determined in a predetermined area between the sensor 91 and the branching unit 411a. Here, the first branch monitoring section 301 is an area that may include five packages.

The second branch monitoring section 302 is determined in a predetermined area between the sensor 92 and the branching unit 421a. Here, the second branch monitoring section 302 is an area that may include five packages, like the first branch monitoring section 301.

The processor 11 counts the number of packages to be sent to the sorter 21 (the first number of packages) and the number of packages to be sent to the sorter 22 (the second number of packages) in the first branch monitoring section 301 and the second branch monitoring section 302. That is, the processor 11 counts the number of packages of which destinations are the Nos. 1 to 100 chutes (packages to be sent to the sorter 21) and the number of packages of which destinations are the Nos. 101 to 200 chutes (packages to be sent to the sorter 22).

In the example illustrated in FIG. 3, "A" indicates a package to be sent to the sorter 21. "B" indicates a package to be sent to the sorter 22.

In the example illustrated in FIG. 3, in the first branch monitoring section 301, the processor 11 counts the number of packages to be sent to the sorter 21 as four. In the second branch monitoring section 302, the processor 11 counts the number of packages to be sent to the sorter 21 as three. Therefore, the processor 11 counts the number of packages to be sent to the sorter 21 as seven.

In the first branch monitoring section 301, the processor 11 counts the number of packages to be sent to the sorter 22 as one. In the second branch monitoring section 302, the processor 11 counts the number of packages to be sent to the sorter 22 as two. Therefore, the processor 11 counts the number of packages to be sent to the sorter 22 as three.

The processor 11 has a function of changing a sorter to which packages are to be sent when the number of packages to be sent to the sorter 21 or the sorter 22 exceeds a predetermined threshold (first threshold) in a predetermined period. For example, when the number of packages to be sent to the sorter 21 in the first branch monitoring section 301 or the second branch monitoring section 302 exceeds a predetermined threshold, the processor 11 performs control to send a package to be sent to the sorter 21, to the sorter 22, in the first branch monitoring section 301 or the second branch monitoring section 302.

The processor 11 performs control to send a package to be sent to the sorter 21, to the sorter 22 in the first branch monitoring section 301 or the second branch monitoring section 302 such that the number of packages to be sent to the sorter 21 from the first branch monitoring section 301 or the second branch monitoring section 302 becomes equal to or less than the predetermined threshold in the predetermined period.

For example, when the number of packages to be sent to the sorter 21 from the first branch monitoring section 301 exceeds the predetermined threshold, the processor 11 performs control to send packages to be sent to the sorter 21 (that is, packages indicated by "A"), to the sorter 22, in a predetermined order in the first branch monitoring section 301. For example, the processor 11 performs control to send packages to be sent to the sorter 21 in order from the first package (that is, a package indicated by the first "A"), to the sorter 22 in the first branch monitoring section 301.

When the number of packages to be sent to the sorter 21 from the second branch monitoring section 302 exceeds the predetermined threshold, the processor 11 performs control to send packages to be sent to the sorter 21, to the sorter 22 in a predetermined order in the second branch monitoring section 302. The processor 11 performs control to send packages to be sent to the sorter 21 in order from the first package to the sorter 22 in the second branch monitoring section 302.

The processor 11 may perform control to send a package to be sent to the sorter 21, to the sorter 22 from the first branch monitoring section 301 and the second branch monitoring section 302 when the number of packages to be sent to the sorter 21 from the first branch monitoring section 301 and the second branch monitoring section 302 exceeds a predetermined threshold.

For example, the processor 11 may perform control to send packages to be sent to the sorter 21, to the sorter 22 alternately from the first branch monitoring section 301 and the second branch monitoring section 302. The processor 11 may perform control to send packages to be sent to the sorter 21, to the sorter 22 in the first branch monitoring section 301 and the second branch monitoring section 302 according to a predetermined algorithm.

When the number of packages to be sent to the sorter 22 in the first branch monitoring section 301 or the second branch monitoring section 302 exceeds a predetermined threshold, the processor 11 performs control to send a package to be sent to the sorter 22 to the sorter 21 in the first branch monitoring section 301 or the second branch monitoring section 302.

An operation example in which the processor 11 perform control to sends a package to be sent to the sorter 22 to the sorter 21 is the same as an operation example in which the processor 11 sends a package to be sent to the sorter 21 to the sorter 22, and thus descriptions thereof will be omitted.

Hereinafter, descriptions will be made on an operation example in which the physical distribution system 1 distributes packages at the branch point 43a and the branch point 44a. Here, the processor 11, as a rule, performs control to send packages whose destinations are the Nos. 1 to 100 chutes to the sorter 22. The processor 11, as a rule, performs control to send packages of which destinations are the Nos. 101 to 200 chutes to the sorter 21.

The processor 11 exceptionally performs control to send packages of which destinations are the Nos. 1 to 100 chutes to the sorter 21. The processor 11 exceptionally performs control to send packages of which destinations are the Nos. 101 to 200 chutes to the sorter 22.

The processor 11 counts the number of packages to be sent to the sorter 21, and the number of packages to be sent to the sorter 22 in a predetermined period. That is, the processor 11 counts the number of packages of which destinations are the Nos. 101 to 200 chutes (packages to be sent to the sorter 21) and the number of packages of which destinations are the Nos. 1 to 100 chutes (packages to be sent to the sorter 22).

The processor 11 changes a sorter to which packages are to be sent, when the number of packages to be sent to the sorter 21 or the sorter 22 exceeds a predetermined threshold in a predetermined period. For example, when the number of packages to be sent to the sorter 21 in a predetermined period exceeds a predetermined threshold, the processor 11 performs control to send a package to be sent to the sorter 21, to the sorter 22 in the predetermined period.

When the number of packages to be sent to the sorter 22 in a predetermined period exceeds a predetermined threshold, the processor 11 sends a package to be sent to the sorter 22, to the sorter 21 in the predetermined section.

The above described operation example is the same as the operation example in which the processor 11 performs control to distribute packages at the branch point 43a and the branch point 44a, and thus detailed descriptions thereof will be omitted.

Hereinafter, descriptions will be made on an operation example in which the physical distribution system 1 causes packages to converge at the junction 51.

Figure 4:
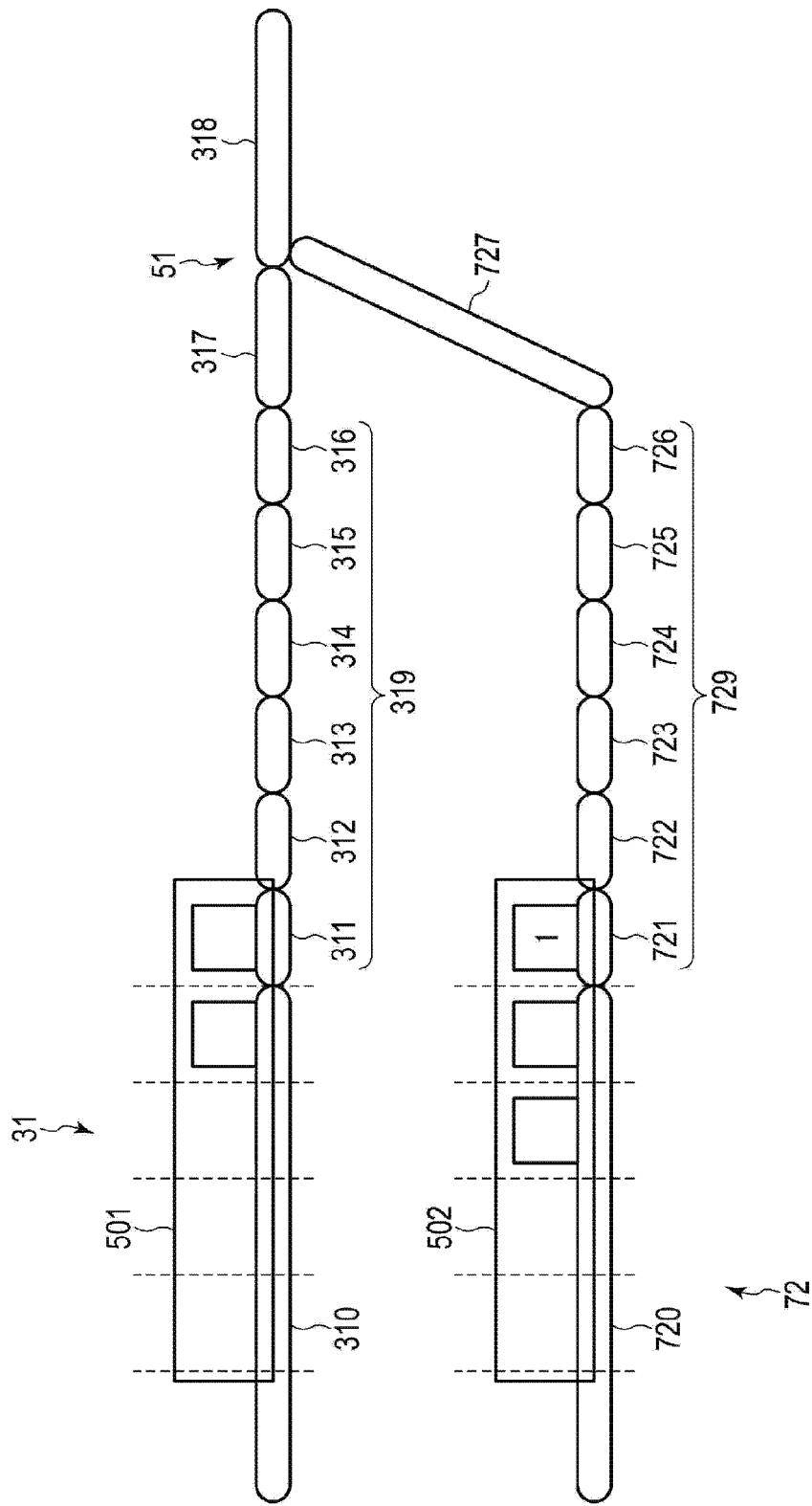
FIGS. 4-9 are each a diagram illustrating an operation example of a junction in the physical distribution system according to an embodiment.

FIG. 4 is a diagram for explaining an operation example in which the physical distribution system 1 causes packages to converge at the junction 51.

As illustrated in FIG. 4, the conveyance path 31 includes a supply mechanism 310, a delivery mechanism 311, intermediate mechanisms 312 to 315, a release mechanism 316, a converging mechanism 317, a transport mechanism 318, and the like. The supply mechanism 310 is connected to the delivery mechanism 311. The delivery mechanism 311 is connected to the intermediate mechanism 312. The intermediate mechanism 312 is connected to the intermediate mechanism 313. The intermediate mechanism 313 is connected to the intermediate mechanism 314. The intermediate mechanism 314 is connected to the intermediate mechanism 315. The intermediate mechanism 315 is connected to the release mechanism 316. The release mechanism 316 is connected to the converging mechanism 317.

The converging mechanism 317 is connected to the transport mechanism 318. The junction 51 is formed between the converging mechanism 317 and the transport mechanism 318.

The delivery mechanism 311, the intermediate mechanisms 312 to 315, and the release mechanism 316 constitute a buffer mechanism. 319 (first buffer mechanism). The buffer mechanism 319 is a mechanism that temporarily accelerates and decelerates a conveyance speed of a package converging at the junction 51. The processor 11 may be configured to control the buffer mechanism 319 to control the conveyance speed of the package proceeding to the junction 51. For example, the processor 11 may control a module (e.g., motor) of the buffer mechanism 319 to achieve the purpose.

The supply mechanism 310 conveys packages from the infeeder 201 to the buffer mechanism 319. The supply mechanism 310 includes a roller and a belt driven by the roller. The supply mechanism 310 conveys packages loaded on the belt by driving the roller.

Each of the delivery mechanism 311, the intermediate mechanisms 312 to 315, and the release mechanism 316 receives and conveys one package. For example, each of the delivery mechanism 311, the intermediate mechanisms 312 to 315, and the release mechanism 316 includes a roller and a belt driven by the roller. Each belt is formed to have a length by which one package is loaded.

The delivery mechanism 311 receives a package from the supply mechanism 310. The delivery mechanism 311 is disposed adjacent to the leading end of the supply mechanism 310. The delivery mechanism 311 receives the package released from the leading end of the supply mechanism 310.

The intermediate mechanism 312 receives a package from the delivery mechanism 311. The intermediate mechanism 312 is disposed adjacent to one end of the delivery mechanism 311. The intermediate mechanism 312 receives the package released from one end of the delivery mechanism 311.

Each of the intermediate mechanisms 313 to 315 receives a package from each of the intermediate mechanisms 312 to 314. Each of the intermediate mechanisms 313 to 315 is disposed adjacent to one end of each of the intermediate mechanisms 312 to 314. Each of the intermediate mechanisms 313 to 315 receives the package released from one end of each of the intermediate mechanisms 312 to 314.

The release mechanism 316 receives a package from the intermediate mechanism 315. The release mechanism 316 is disposed adjacent to one end of the intermediate mechanism 315. The release mechanism 316 receives the package released from one end of the intermediate mechanism 315.

The converging mechanism 317 receives a package from the release mechanism 316. The converging mechanism 317 is disposed adjacent to one end of the release mechanism 316. The converging mechanism 317 receives the package released from one end of the release mechanism 316.

The converging mechanism 317 conveys a package to the junction 51. The converging mechanism 317 sends the package to the transport mechanism 318 at the junction 51 based on a control from the processor 11. The converging mechanism 317 includes a roller, and a belt driven by the roller. The converging mechanism 317 conveys the package loaded on the belt by driving the roller.

The transport mechanism 318 supplies a package sent by the converging mechanism 317 or a converging mechanism 727 to be descried below, at the junction 51 to the sorter 21. The transport mechanism 318 includes a roller and a belt driven by the roller. The transport mechanism 318 conveys the package loaded on the belt by driving the roller.

As illustrated in FIG. 4, the conveyance path 72 includes a supply mechanism 720, a delivery mechanism 721, intermediate mechanisms 722 to 725, a release mechanism 726, and the converging mechanism 727. The supply mechanism 720 is connected to the delivery mechanism 721. The delivery mechanism 721 is connected to the intermediate mechanism 722. The intermediate mechanism 722 is connected to the intermediate mechanism 723. The intermediate mechanism 723 is connected to the intermediate mechanism 724. The intermediate mechanism 724 is connected to the intermediate mechanism 725. The intermediate mechanism 725 is connected to the release mechanism 726. The release mechanism 726 is connected to the converging mechanism 727. The converging mechanism 727 is connected to the transport mechanism 318, at the junction 51.

The delivery mechanism 721, the intermediate mechanisms 722 to 725, and the release mechanism 726 constitute a buffer mechanism 729 (second buffer mechanism). The supply mechanism 720 conveys packages from the infeeder 202 to the buffer mechanism 729. The supply mechanism 720 includes a roller and a belt driven by the roller. The supply mechanism 720 conveys packages loaded on the belt by driving the roller.

Configurations of the delivery mechanism 721, the intermediate mechanisms 722 to 725, the release mechanism 726, and the converging mechanism 727 are the same as those of the delivery mechanism 311, the intermediate mechanisms 312 to 315, the release mechanism 316, and the converging mechanism 317, respectively, and thus descriptions thereof will be omitted.

Each of the buffer mechanism 319 and the buffer mechanism 729 controls a conveyance speed of packages based on the number of packages converging at the junction 51 or the like.

Hereinafter, an operation example of the processor 11 will be described. A function performed by the processor 11 is performed when the processor 11 executes programs stored in the ROM 12 or the NVM 14.

First, the processor 11 has a function of assigning priorities to packages conveyed to the junction 51 along the conveyance path 31 and packages conveyed to the junction 51 along the conveyance path 72.

The priorities indicate the order in which packages are to be sent to the transport mechanism 318 at the junction 51.

Here, the processor 11 assigns priorities to packages sent to the buffer mechanism 319 or the buffer mechanism 729.

It is assumed that the processor 11 determines packages present in the supply mechanism. 310, the buffer mechanism. 319, the supply mechanism 720, and the buffer mechanism 729, and positions of the packages. For example, the processor 11 specifies packages present in the supply mechanism. 310, the buffer mechanism. 319, the supply mechanism. 720, and the buffer mechanism 729 and positions of the packages based on packages detected by the sensor 91 and the sensor 92 and timings of detection and the like.

The processor 11 assigns a priority at a predetermined timing (a timing at which a predetermined trigger occurs). For example, the processor 11 assigns a priority to a package at a timing at which the package is sent to the buffer mechanism 319 or the buffer mechanism 729, as a timing at which a predetermined trigger occurs.

The processor 11 assigns a priority at each timing at which a package is conveyed by a predetermined distance, as a timing at which a predetermined trigger occurs. For example, the processor 11 assigns a priority at each timing at which a package is conveyed by one block. Here, one block is a distance including one package. For example, one block is a distance between adjacent two among the delivery mechanism 311, the intermediate mechanisms 312 to 315, and the release mechanism 316.

In the example illustrated in FIG. 4, the processor 11 determines that a package has been sent to each of the delivery mechanism 311 of the buffer mechanism 319 and the delivery mechanism 721 of the buffer mechanism 729.

Upon determining that a package has been sent to each of the delivery mechanism 311 and the delivery mechanism 721, the processor 11 determines whether there are any packages to which priorities are not assigned (an unallocated package), in both the buffer mechanism 319 and the buffer mechanism 729.

In FIG. 4, an outlined package indicates that the package is not assigned a priority. In the example illustrated in FIG. 4, the processor 11 determines that there are unallocated packages in both the buffer mechanism 319 and the buffer mechanism 729.

When determining that there are unallocated packages in both the buffer mechanism 319 and the buffer mechanism 729, the processor 11 determines a convergence monitoring section in the conveyance path (31 and 72). The convergence monitoring section is determined to be at a position from the first one of the unallocated packages toward the upstream. The convergence monitoring section is determined to have a length of five blocks.

In the example illustrated in FIG. 4, the processor 11 sets a first convergence monitoring section 501 in the conveyance path 31.

The first convergence monitoring section 501 is determined to have a length of five blocks from the first unallocated package (a package loaded on the delivery mechanism 311) toward the upstream.

The processor 11 determines a second convergence monitoring section 502 in the conveyance path 72.

The second convergence monitoring section 502 is determined to have a length of five blocks from the first unallocated package (a package loaded on the delivery mechanism 721) toward the upstream.

When the convergence monitoring section is determined, the processor 11 counts the number of packages present in each convergence monitoring section. In the example illustrated in FIG. 4, the processor 11 counts the number of packages present in the first convergence monitoring section 501 as two. The processor 11 counts the number of packages present in the second convergence monitoring section 502 as three.

After counting the number of packages present in each convergence monitoring section, the processor 11 assigns a priority to the first unallocated package in a convergence monitoring section with a high count.

In the example illustrated in FIG. 4, the processor 11 determines that the number (three) of packages present in the second convergence monitoring section 502 is larger than the number (two) of packages present in the first convergence monitoring section 501. Therefore, the processor 11 assigns a priority to the first unallocated package in the second convergence monitoring section 502 (the package loaded on the delivery mechanism 721). Here, since there is no package to which a priority is assigned, the processor 11 assigns a priority "1" to the first unallocated package in the second convergence monitoring section 502.

When the number of packages present in the first convergence monitoring section 501 is the same as the number of packages present in the second convergence monitoring section 502, the processor 11 assigns a priority to the first package in the first convergence monitoring section 501.

Figure 5:
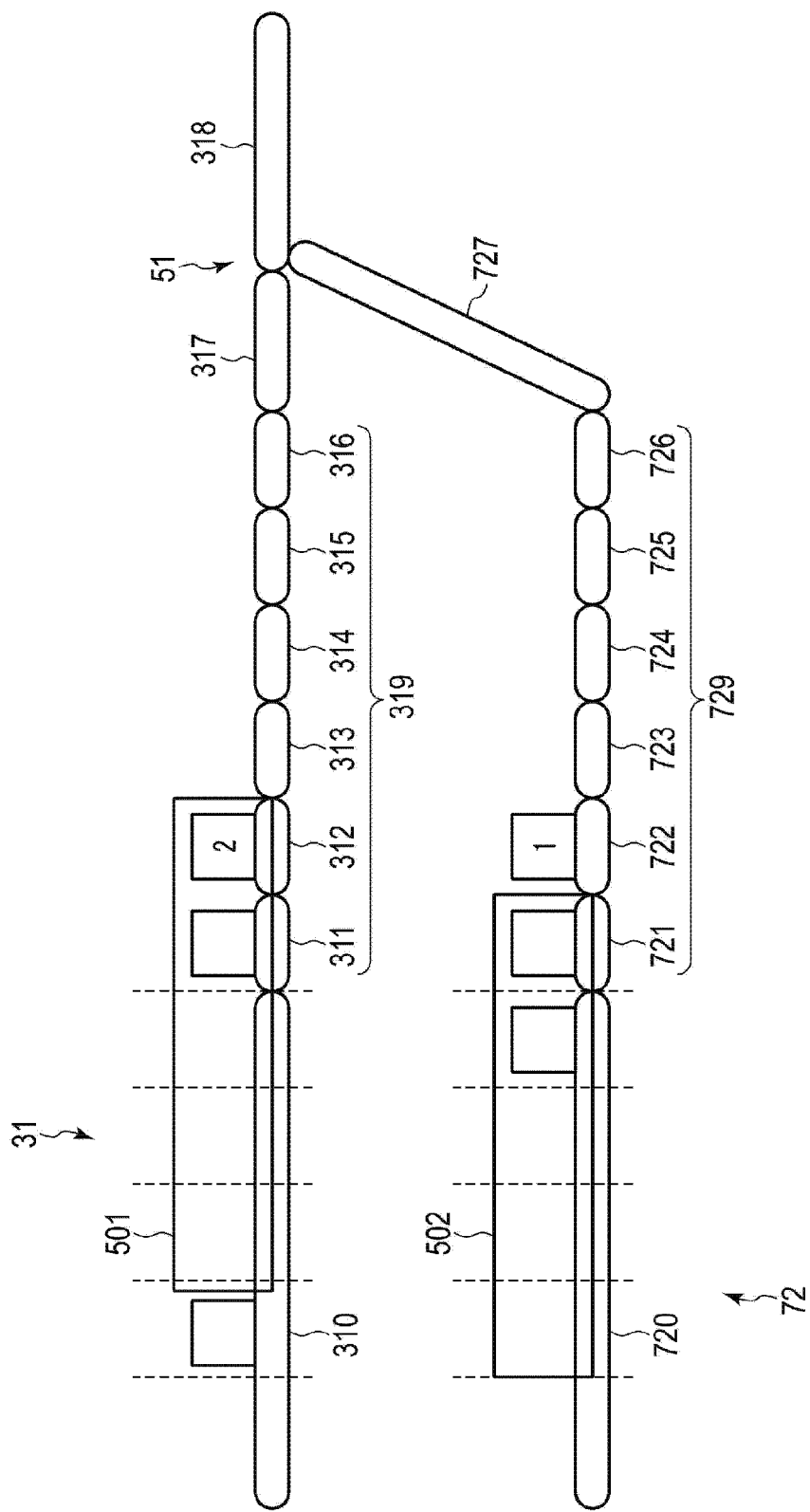

Hereinafter, descriptions will be made on a state where packages are conveyed from the state of FIG. 4 by one block. FIG. 5 illustrates a state in which packages are conveyed from the state of FIG. 4 by one block. In the example illustrated in FIG. 5, the processor 11 determines that a package has been sent to each of the delivery mechanism 311 of the buffer mechanism 319 and the delivery mechanism 721 of the buffer mechanism 729.

Upon determining that a package has been sent to each of the delivery mechanism 311 and the delivery mechanism 721, the processor 11 determines that there are unallocated packages in both the buffer mechanism 319 and the buffer mechanism 729. When determining that there are unallocated packages in both the buffer mechanism 319 and the buffer mechanism 729, the processor 11 determines the first convergence monitoring section 501 and the second convergence monitoring section 502 in the conveyance paths 31 and 72, respectively.

The first convergence monitoring section 501 is determined to have a length of five blocks from the first unallocated package (a package loaded on the intermediate mechanism 312) toward the upstream. The second convergence monitoring section 502 is determined to have a length of five blocks from the first unallocated package (a package loaded on the delivery mechanism 721) toward the upstream.

After determining the first convergence monitoring section 501 and the second convergence monitoring section 502, the processor 11 counts the number of packages present in each of the first convergence monitoring section 501 and the second convergence monitoring section 502. In the example illustrated in FIG. 5, the processor 11 counts the number of packages present in the first convergence monitoring section 501, as two. The processor 11 counts the number of packages present in the second convergence monitoring section 502 as two.

After counting the number of packages present in each convergence monitoring section, the processor 11 assigns a priority to the first package in a convergence monitoring section with a high count. Here, the processor 11 determines that the same number of packages are present in both convergence monitoring sections, and thus assigns a priority to the first unallocated package in the first convergence monitoring section 501.

The processor 11 assigns a priority "2" to the first unallocated package in the first convergence monitoring section 501.

Figure 6:
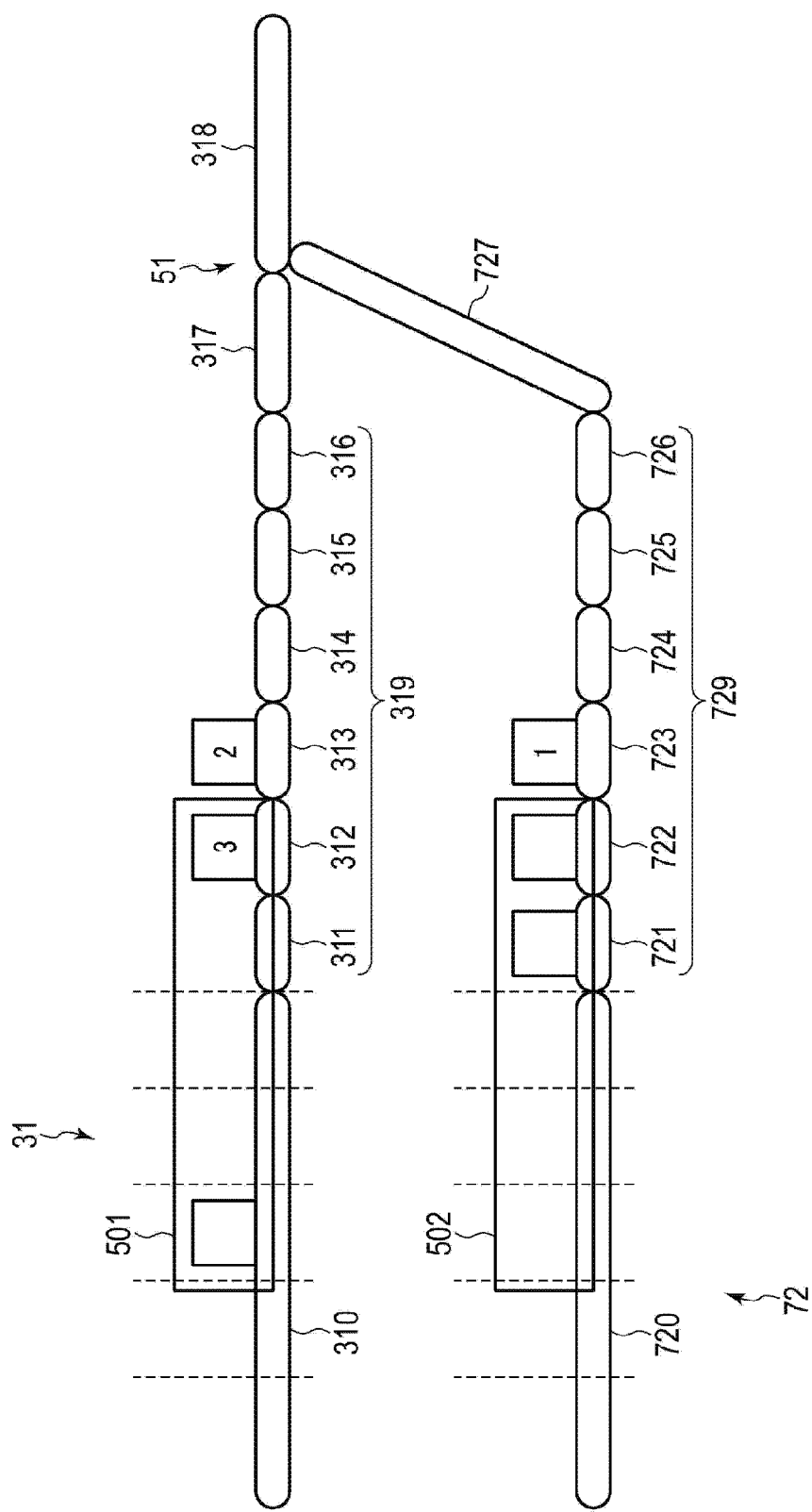

Hereinafter, descriptions will be made on a state where packages are conveyed from the state of FIG. 5 by one block. FIG. 6 illustrates a state in which packages are conveyed from the state of FIG. 5 by one block. In the example illustrated in FIG. 6, the processor 11 determines that a package has bene sent to the delivery mechanism 721 of the buffer mechanism 729.

Upon determining that a package is sent to the delivery mechanism 721, the processor 11 determines the first convergence monitoring section 501 and the second convergence monitoring section 502 in the conveyance paths 31 and 72, respectively.

The first convergence monitoring section 501 is determined to have a length of five blocks from the first unallocated package (a package loaded on the intermediate mechanism 312) toward the upstream. The second convergence monitoring section 502 is determined to have a length of five blocks from the first unallocated package (a package loaded on the intermediate mechanism 722) toward the upstream.

After determining the first convergence monitoring section 501 and the second convergence monitoring section 502, the processor 11 counts the number of packages in each of the first convergence monitoring section 501 and the second convergence monitoring section 502.

In the example illustrated in FIG. 5, the processor 11 counts the number of packages present in the first convergence monitoring section 501 as two. The processor 11 counts the number of packages present in the second convergence monitoring section 502 as two.

After counting the number of packages present in each convergence monitoring section, the processor 11 assigns a priority to the first package in a convergence monitoring section with a high count. Here, the processor 11 determines that the same number of packages are present in both convergence monitoring sections, and thus assigns a priority to the first unallocated package in the first convergence monitoring section 501.

The processor 11 assigns a priority "3" to the first unallocated package in the first convergence monitoring section 501.

Figure 7:
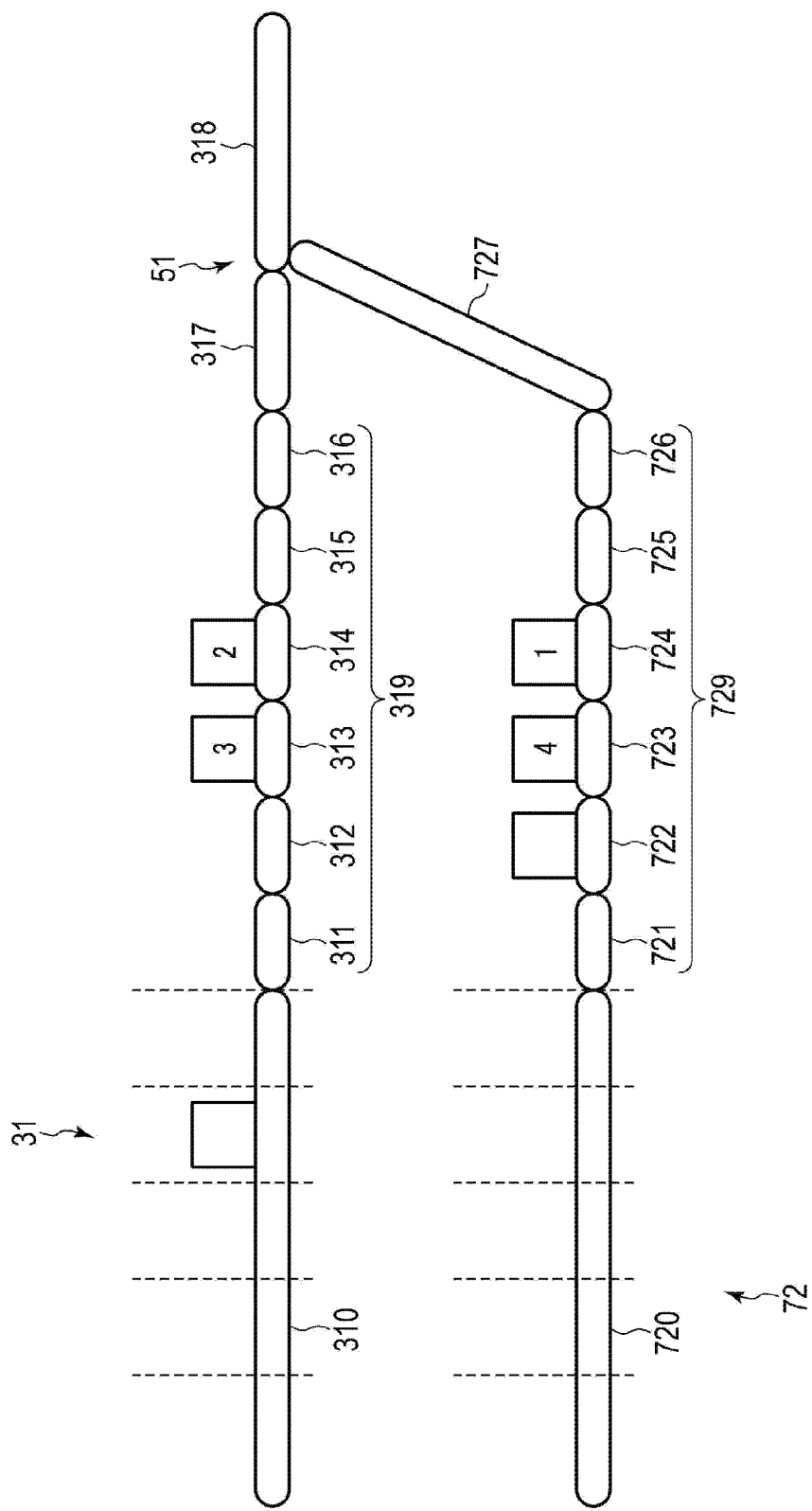

Hereinafter, descriptions will be made on a state where packages are conveyed from the state of FIG. 6 by one block. FIG. 7 illustrates a state in which packages are conveyed from the state of FIG. 6 by one block. In the example illustrated in FIG. 7, the processor 11 determines that each package has been conveyed by one block.

Upon determining that each package is conveyed by one block, the processor 11 determines whether there are unallocated packages in both the buffer mechanism 319 and the buffer mechanism 729.

In the example illustrated in FIG. 7, the processor 11 determines that there is no unallocated package in the buffer mechanism 319.

When determining that there is no unallocated package in one of the buffer mechanism 319 and the buffer mechanism 729 and there is in the other, the processor 11 assigns a priority to the first unallocated package in the buffer mechanism 319 or the buffer mechanism 729.

In the example illustrated in FIG. 7, the processor 11 assigns a priority to the first unallocated package (a package loaded on the intermediate mechanism 723) in the buffer mechanism 729.

The processor 11 assigns a priority "4" to the corresponding unallocated package (the package loaded on the intermediate mechanism 723).

Figure 8:
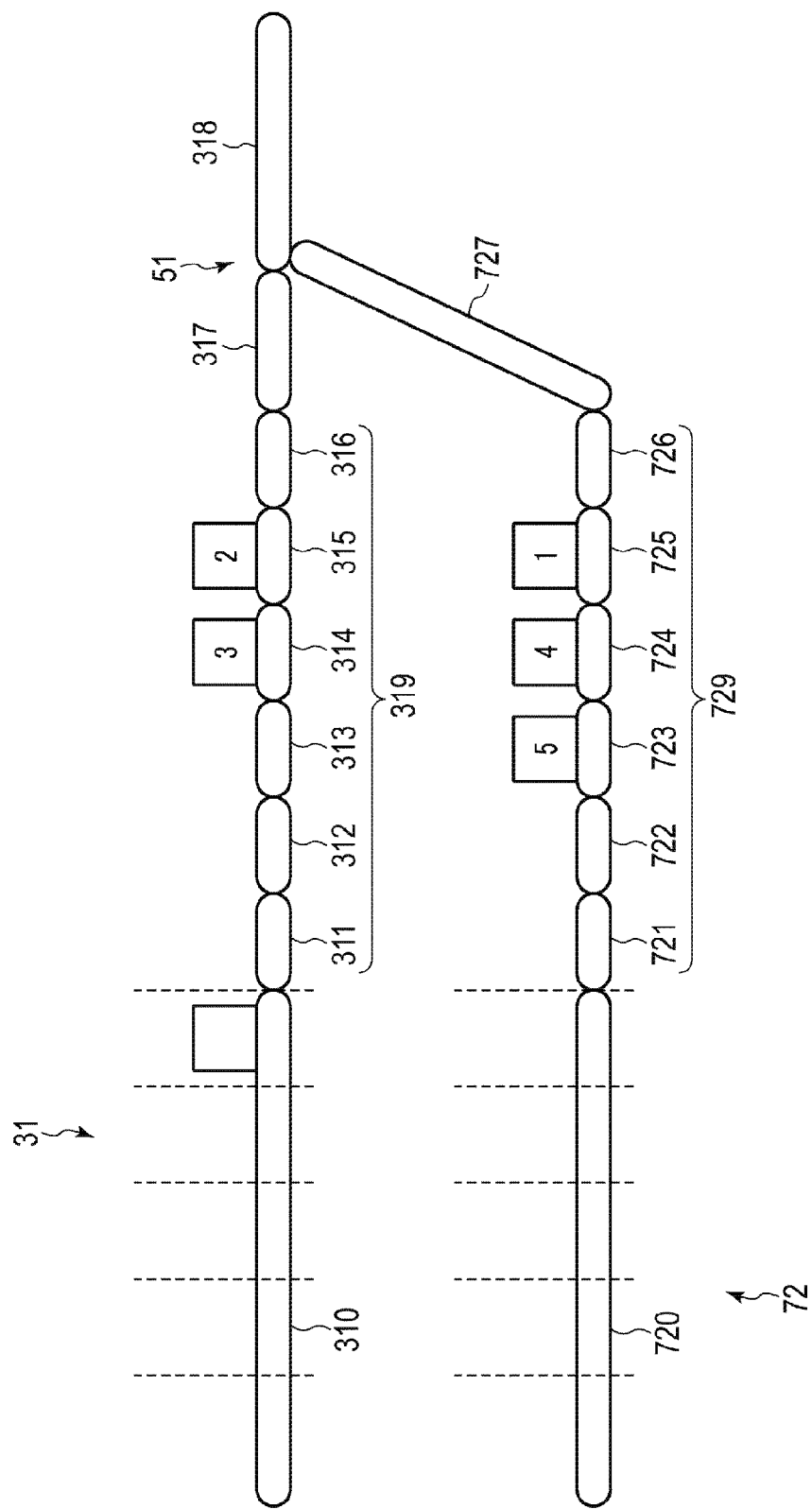

Hereinafter, descriptions will be made on a state where packages are conveyed from the state of FIG. 7 by one block. FIG. 8 illustrates a state in which packages are conveyed from the state of FIG. 7 by one block. In the example illustrated in FIG. 8, the processor 11 determines that each package has been conveyed by one block.

Upon determining that each package has been conveyed by one block, the processor 11 determines whether there are unallocated packages in both the buffer mechanism 319 and the buffer mechanism 729.

In the example illustrated in FIG. 8, the processor 11 determines that there is no unallocated package in the buffer mechanism 319.

When determining that there is no unallocated package in one of the buffer mechanism 319 and the buffer mechanism 729 and there is in the other, the processor 11 assigns a priority to the first unallocated package in the buffer mechanism 319 or the buffer mechanism 729.

In the example illustrated in FIG. 8, the processor 11 assigns a priority to the first unallocated package (a package loaded on the intermediate mechanism 723) in the buffer mechanism 729.

The processor 11 assigns a priority "5" to the corresponding unallocated package (the package loaded on the intermediate mechanism 723).

Figure 9:
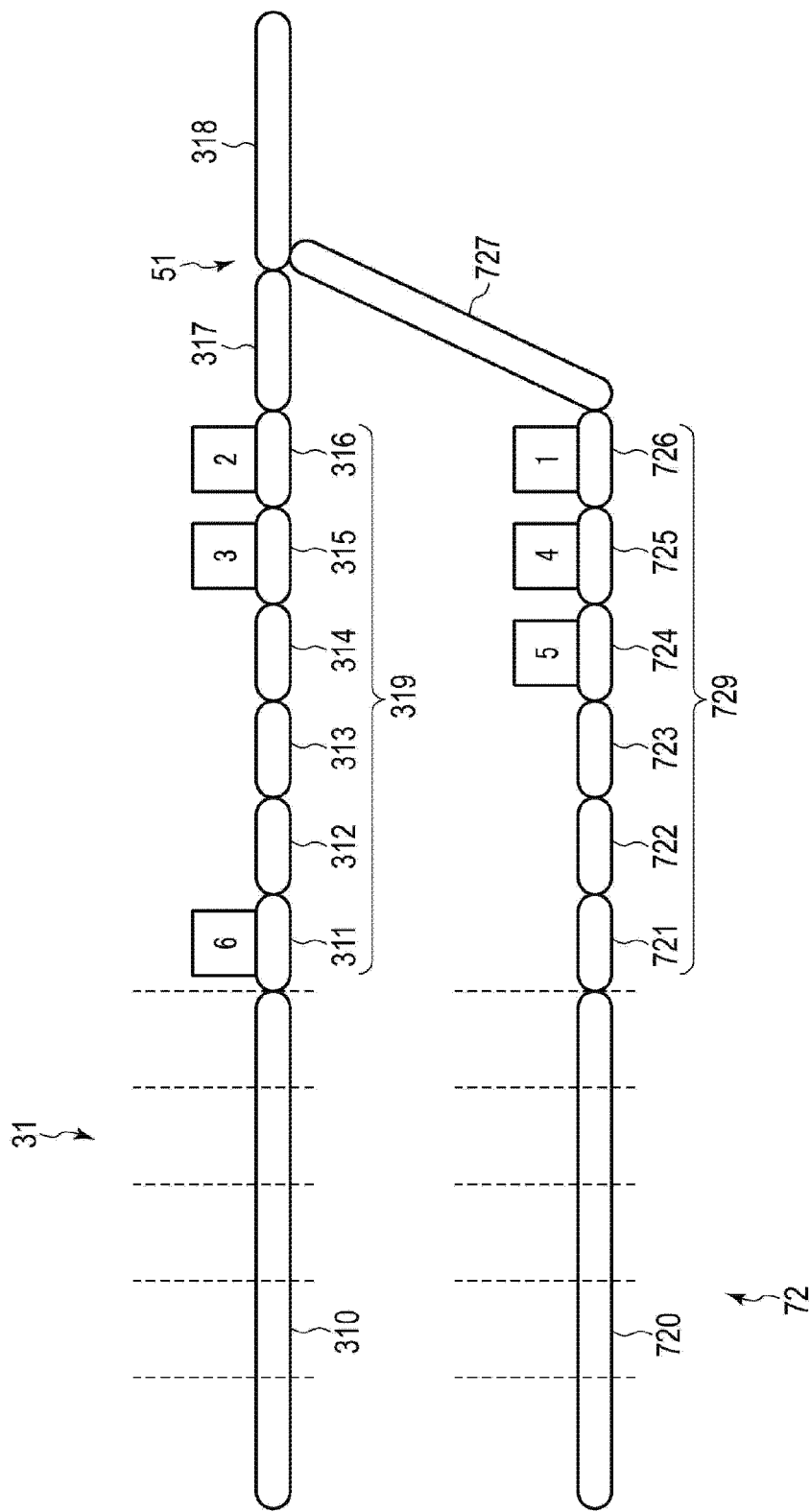

Hereinafter, descriptions will be made on a state where packages are conveyed from the state of FIG. 8 by one block. FIG. 9 illustrates a state in which packages are conveyed from the state of FIG. 8 by one block. In the example illustrated in FIG. 9, the processor 11 determines that each package has been conveyed by one block.

Upon determining that each package has been conveyed by one block, the processor 11 determines whether or not there are unallocated packages in both the buffer mechanism 319 and the buffer mechanism 729.

In the example illustrated in FIG. 9, the processor 11 determines that there is no unallocated package in the buffer mechanism 729.

When determining that there is no unallocated package in both the buffer mechanism 319 and the buffer mechanism 729, the processor 11 assigns a priority to the first unallocated package in the buffer mechanism 319 or the buffer mechanism 729.

In the example illustrated in FIG. 9, the processor 11 assigns a priority to the first unallocated package (a package loaded on the delivery mechanism 311) in the buffer mechanism 319.

The processor 11 assigns a priority "6" to the corresponding unallocated package (the package loaded on the delivery mechanism 311).

When determining that there is no unallocated package in both of the buffer mechanism 319 and the buffer mechanism 729, the processor 11 may not perform assignment of a priority to an unallocated package.

The processor 11 performs control to send packages to the transport mechanism 318 according to priorities, at the junction 51. For example, the processor 11 performs control to take out a package assigned the lowest priority from the buffer mechanism 319 or 729 and to send the package to the converging mechanism 317 or 727. After performing control to send the corresponding package to the converging mechanism 317 or 727, the processor 11 performs control to send the corresponding package to the transport mechanism 318 from the converging mechanism 317 or 727.

The processor 11 performs control to send packages to the transport mechanism 318 at the junction 51 such that the packages may be sent to respective trays of the sorter 21 without excess or deficiency.

The processor 11 may hold packages assigned subsequent priorities in the buffer mechanism 319 or the buffer mechanism 729. The processor 11 may delay a conveyance speed of the corresponding packages.

Figure 10:
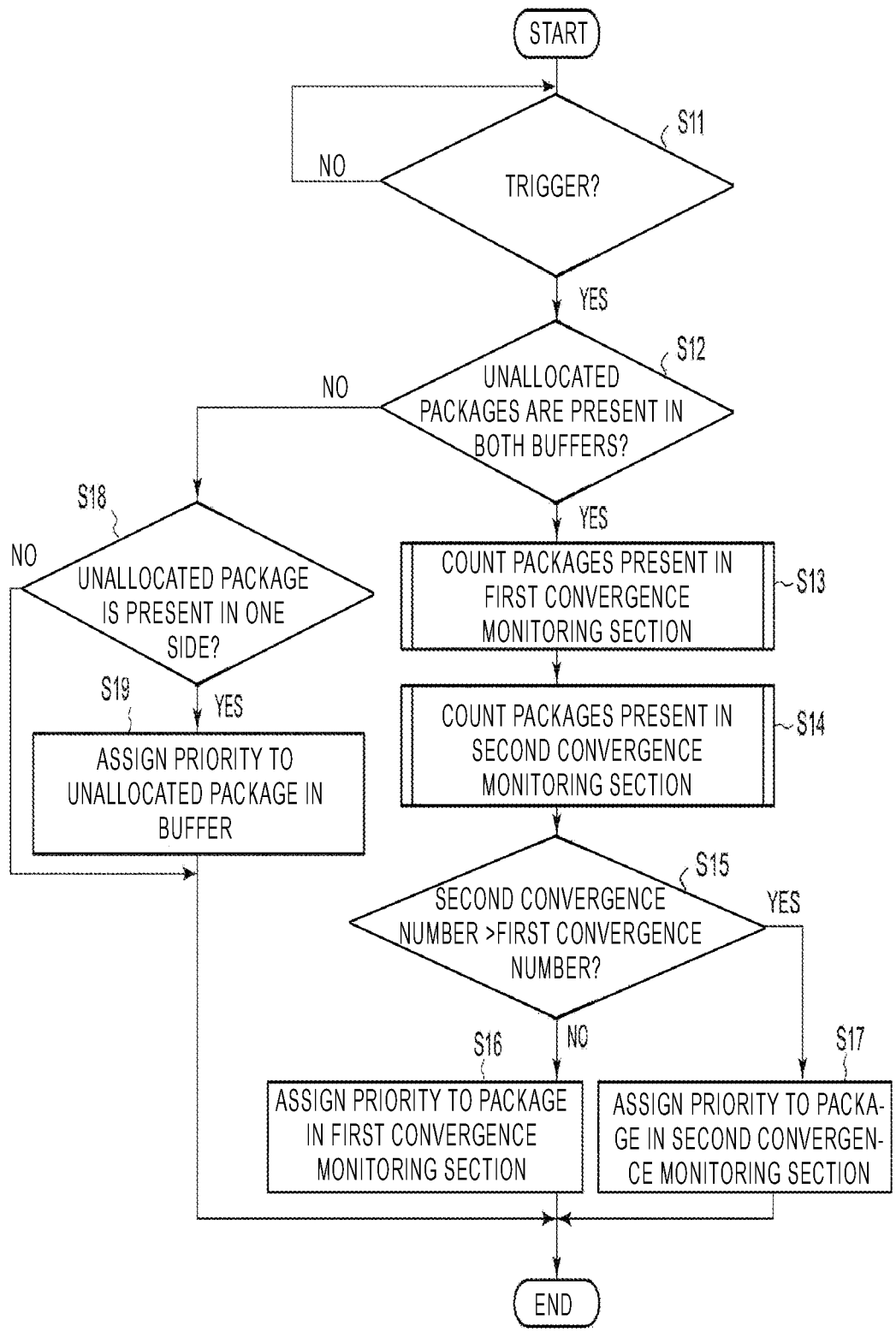
FIG. 10 is a flowchart illustrating an operation example of the physical distribution system according to an embodiment.

Hereinafter, descriptions will be made on an operation example in which the processor 11 assigns a priority, with reference to a flow chart. FIG. 10 is a flow chart for explaining an operation example in which the processor 11 assigns a priority.

First, the processor 11 determines whether or not a predetermined trigger has occurred (S11). When determining that no predetermined trigger has occurred (S11, NO), the processor 11 returns to S11.

When determining that a predetermined trigger has occurred (S11, YES), the processor 11 determines whether or not unallocated packages are present in both the buffer mechanism 319 and the buffer mechanism 729 (S12).

When determining that unallocated packages are present in both (S12, YES), the processor 11 counts the number of unallocated packages present in the first convergence monitoring section 501 (first convergence number) (S13).

Upon counting the first convergence number, the processor 11 counts the number of unallocated packages present in the second convergence monitoring section 502 (second convergence number) (S14).

Upon counting the second convergence number, the processor 11 determines whether or not the second convergence number is larger than the first convergence number (S15).

When it is determined that the second convergence number is equal to or smaller than the first convergence number (S15, NO), the processor 11 assigns a priority to the first unallocated package present in the first convergence monitoring section 501 (S16).

When it is determined that the second convergence number is larger than the first convergence number (S15, YES), the processor 11 assigns a priority to the first unallocated package present in the second convergence monitoring section 502 (S17).

When the priority is assigned to the first unallocated package present in the first convergence monitoring section 501 (S16), or the priority is assigned to the first unallocated package present in the second convergence monitoring section 502 (S17), the processor 11 ends the operation.

When determining that there is no unallocated package in both the buffer mechanism 319 and the buffer mechanism 729 (S12, NO), the processor 11 determines whether or not there is any unallocated package in either the buffer mechanism 319 or the buffer mechanism 729 (S18).

When determining that there is any unallocated package in either the buffer mechanism 319 or the buffer mechanism 729 (S18, YES), the processor 11 assigns a priority to the first unallocated package present in the buffer mechanism 319 or the buffer mechanism 729 (S19).

When it is determined that there is no unallocated package in either the buffer mechanism 319 or the buffer mechanism 729 (S18, NO), or when a priority is assigned to the first unallocated package present in the buffer mechanism 319 or the buffer mechanism 729 (S19), the processor 11 ends the operation.

Hereinafter, descriptions will be made on an operation example (S13 and S14) in which the processor 11 counts the number of unallocated packages present in the first convergence monitoring section 501 and the second convergence monitoring section 502. Here, descriptions will be made on, as a representative, an operation example (S13) in which the processor 11 counts the number of unallocated packages present in the first convergence monitoring section 501.

Figure 11:
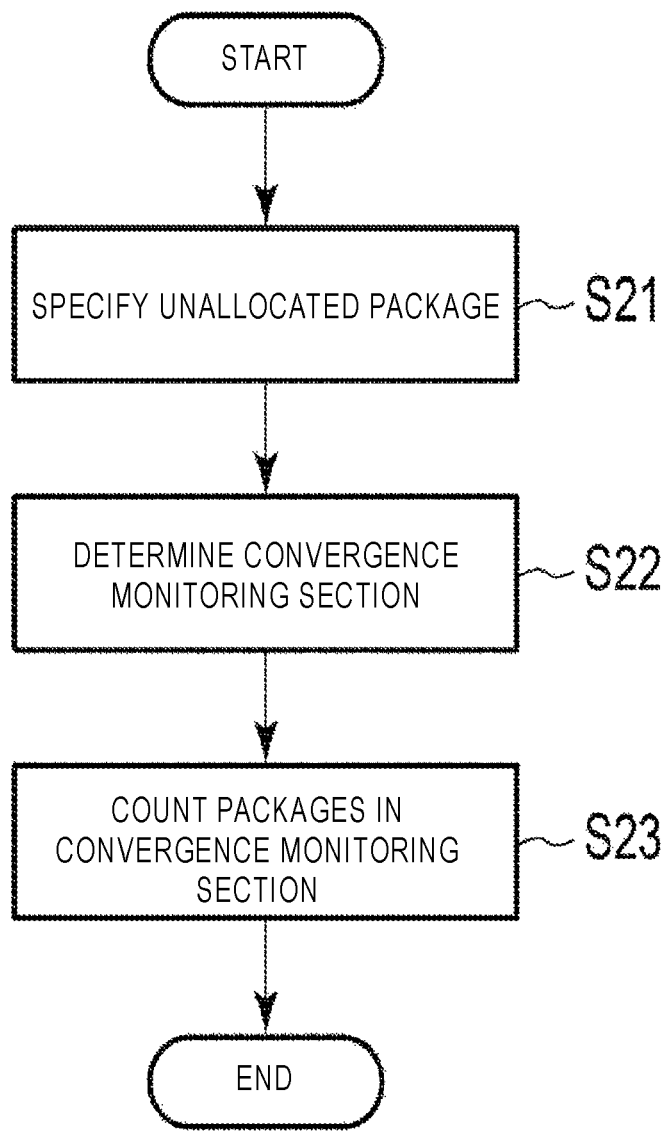
FIG. 11 is a flowchart illustrating an operation example of the physical distribution system according to an embodiment.

FIG. 11 is a flow chart for explaining the operation example (S13) in which the processor 11 counts the number of unallocated packages present in the first convergence monitoring section 501.

First, the processor 11 specifies the first unallocated package in the buffer mechanism 319 (S21). Upon specifying the first unallocated package, the processor 11 determines the first convergence monitoring section 501 to have a length of five blocks from the first unallocated package toward the infeeder 201 side (S22).

Upon determining the first convergence monitoring section 501, the processor 11 counts the number of unallocated packages present in the first convergence monitoring section 501 (S23). Upon counting the number of unallocated packages present in the first convergence monitoring section 501, the processor 11 ends the operation.

The processor 11 assigns priorities to packages through the same operations at the junctions 52 to 54 as well.

Hereinafter, descriptions will be made on an operation example in which the processor 11 performs control to distribute packages at the branch point 41a. The processor 11 performs control to send packages conveyed by the conveyance path 31 via the branch point 41a, to the conveyance path 81, according to the number of packages converging at the junction 51.

For example, the processor 11 counts the number of packages converging at the junction 51 during a predetermined period. For example, the processor 11 counts the number of packages present in the buffer mechanism 319 and the number of packages present in the buffer mechanism 729. After counting the both numbers, the processor 11 calculates the sum of the both numbers.

When the sum exceeds a predetermined threshold (for example, nine) (second threshold), the processor 11 performs control to send packages conveyed by the conveyance path 31 via the branch point 41a, to the conveyance path 81. That is, the processor 11 performs control to send packages conveyed by the conveyance path 31, via the junction 61a, to the sorter 21.

The processor 11 performs the same operation at the branch points 42a, 43a and 44a as well.

The processor 11 may assign priorities to packages present in the supply mechanism 310 or the supply mechanism 720. For example, the processor 11 may determine a convergence monitoring section from the first unallocated package present in the supply mechanism 310 or the supply mechanism 720. The supply mechanism 310 or the supply mechanism 720 may be implemented by a physical distribution elevator.

A package may have a wireless tag indicating a destination. In this case, the sensor 91 and the sensor 92 are readers used for reading the wireless tag. The processor 11 specifies the destination of the package by reading the wireless tag by using the sensor 91 and the sensor 92.

The sorter 21 may include the Nos. 1 to 100 chutes. The sorter 22 may include the Nos. 101 to 200 chutes.

The physical distribution system 1 may not include the infeeders 203 and 204 for the conveyance paths 33 and 34, 53 and 54, 73 and 74, and 83 and 84.

The physical distribution system configured as described above includes a buffer mechanism in each conveyance path, at a junction between conveyance paths. Based on the number of the first unallocated package and subsequent unallocated packages in each buffer mechanism, the physical distribution system assigns a priority to an unallocated package present in a buffer mechanism with a high count. As a result, the physical distribution system may preferentially cause packages in a buffer mechanism in which a large number of packages may possibly stagnate, to converge.

When the number of packages converging at a junction in a predetermined period exceeds a predetermined threshold, the physical distribution system takes out packages at a branch point at the upstream of the junction and sends the packages to the middle of a sorter. As a result, the physical distribution system may prevent the packages from clogging at the junction. By sending the packages to the middle of the sorter, the physical distribution system may effectively utilize empty trays up to the middle of the sorter.

When the number of packages to be sent to a certain sorter in a predetermined period exceeds a predetermined threshold, the physical distribution system sends the packages to be sent to the certain sorter, to another sorter. As a result, the physical distribution system may prevent the packages from concentrating on the certain sorter. The physical distribution system may prevent the packages from clogging at a junction at which the packages to be sent to the certain sorter are allowed to converge.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A physical distribution system comprising:
a first conveyance path;
a second conveyance path that merges with the first conveyance path at a first junction;
a first sensor configured to detect a package passing along the first conveyance path to the first junction;
a second sensor configured to detect a package passing along the second conveyance path to the first junction; and
a processor configured to:
 count a first number of packages present in a first convergence monitoring section that is determined in the first conveyance path upstream the first junction, by using the first sensor,
 count a second number of packages present in a second convergence monitoring section that is determined in the second conveyance path upstream the first junction, by using the second sensor,
 determine an order in which packages in the first convergence monitoring section and packages in the second convergence monitoring section pass the first junction, based on the first number and the second number, and
 control the first and second conveyance paths, such that the packages pass the first junction in the determined order.

2. The physical distribution system according to claim 1, wherein the processor determines a leading one of one or more packages in the first convergence monitoring section to pass the first junction first, when the first number is greater than the second number, and determines a leading one of one or more packages in the second convergence monitoring section to pass the first junction first, when the second number is greater than the first number.

3. The physical distribution system according to claim 1, wherein the processor determines the first convergence monitoring section with a first predetermined length upstream from a leading package in the first conveyance path for which the order has not been determined, and determines the second convergence monitoring section with a second predetermined length upstream from a leading package in the second conveyance path for which the order has not been determined.

4. The physical distribution system according to claim 3, wherein the first predetermined length is equal to the second predetermined length.

5. The physical distribution system according to claim 3, wherein
the first conveyance path includes a first buffer mechanism at upstream of the first junction,
the second conveyance path includes a second buffer mechanism at upstream of the first junction, and
the processor determines the first convergence monitoring section with the first predetermined length upstream from a leading package on the first buffer mechanism for which the order has not been determined, and determines the second convergence monitoring section with the second predetermined length upstream from a leading package on the second buffer mechanism for which the order has not been determined.

6. The physical distribution system according to claim 5, wherein the processor controls a conveyance speed of at least one of the first buffer mechanism and the second buffer mechanism such that packages pass the first junction in the order.

7. The physical distribution system according to claim 1, wherein
the first conveyance path is connected to a first sorter,
the physical distribution system further comprises:
 a third conveyance path connected to a second sorter; and
 a fourth conveyance path that is connected to the first conveyance path at a first branch point upstream the first junction, and connected to the third conveyance path,
the second conveyance path is connected to the third conveyance path at a second branch point, and receives packages conveyed from the third conveyance path at the second branch point,
the first sensor acquires first information on a destination of the package detected by the first sensor,
the second sensor acquires second information on a destination of the package detected by the second sensor, and
the processor is further configured to:
 count a third number of packages that are originally determined to be conveyed to the first sorter and are located in a first branch monitoring section that is determined in the first conveyance path upstream the first branch point, based on the first information, by using the first sensor,
 count a fourth number of packages that are originally determined to be conveyed to the first sorter and are located in a second branch monitoring section that is determined in the second conveyance path upstream the second branch point, based on the second information, by using the second sensor, and
 control the first branch point to perform branching of packages between the first conveyance path and the fourth conveyance path at the first branch point and control the second branch point to perform branching of packages between the third conveyance path and the second conveyance path at the second branch point.

8. The physical distribution system according to claim 7, wherein when the third number or the fourth number exceeds a threshold, the processor controls the first or second branch point such that a package that is originally determined to be conveyed to the first sorter and located in the first branch monitoring section or the second branch monitoring section, is to be sent to the second sorter.

9. The physical distribution system according to claim 1, wherein
the first conveyance path is connected to a first sorter via a second junction,
the physical distribution system further comprises:
 a third conveyance path connected to a second sorter via a third junction;
 a fourth conveyance path connected to the first conveyance path at a first branch point upstream the first junction, and receives packages conveyed from the first conveyance path at the first branch point to convey to the third conveyance path;
 a fifth conveyance path connected to the first sorter via a fourth junction different from the second junction; and
 a sixth conveyance path connected to the second sorter via a fifth junction different from the third junction, and the second conveyance path is connected to the third conveyance path at a second branch point, and receives packages from the third conveyance path at the second branch point.

10. The physical distribution system according to claim 9, wherein
the first conveyance path includes a first buffer mechanism at upstream of the first junction,
the second conveyance path includes a second buffer mechanism at upstream of the first junction, and
the first conveyance path is connected to a first sorter via a second junction,
the physical distribution system further comprises a seventh conveyance path connected to the first conveyance path via a third branch point present upstream the first junction, and to the first sorter via a sixth junction different from the second junction, and receives packages conveyed from the first conveyance path to the first sorter, and
the processor causes part of packages conveyed along the first conveyance path to be conveyed to the first sorter via the seventh conveyance path based on the number of packages present in the first buffer mechanism and the second buffer mechanism.

11. A method for physical distribution executed by one or more processors, the method comprising:
counting a first number of packages present in a first convergence monitoring section that is determined in a first conveyance path upstream a first junction at which a second conveyance path merges with the first conveyance path;
counting a second convergence number of packages present in a second convergence monitoring section that is determined in the second conveyance path upstream the first junction;
determining an order in which packages in the first convergence monitoring section and packages in the second convergence monitoring section pass the first junction, based on the first number and the second number; and
controlling the first and second conveyance paths, such that the packages pass the first junction in the determined order.

12. The method according to claim 11, further comprising:
determining a leading one of one or more packages in the first convergence monitoring section to pass the first junction first, when the first number is greater than the second number; and
determining a leading one of one or more packages in the second convergence monitoring section to pass the first junction first, when the second number is greater than the first number.

13. The method according to claim 11, further comprising:
determining the first convergence monitoring section with a first predetermined length upstream from a leading package in the first conveyance path for which the order has not been determined; and
determining the second convergence monitoring section with a second predetermined length upstream from a leading package in the second conveyance path for which the order has not been determined.

14. The method according to claim 13, wherein the first predetermined length is equal to the second predetermined length.

15. The method according to claim 11, wherein
the first conveyance path includes a first buffer mechanism at upstream of the first junction,
the second conveyance path includes a second buffer mechanism at upstream of the first junction, and
the method further comprises:
determining the first convergence monitoring section with the first predetermined length upstream from a leading package on the first buffer mechanism for which the order has not been determined; and
determining the second convergence monitoring section with the second predetermined length upstream from a leading package on the second buffer mechanism for which the order has not been determined.

16. A computer readable medium storing a program causing one or more processors to execute a process comprising:
counting a first number of packages present in a first convergence monitoring section that is determined in a first conveyance path upstream a first junction at which a second conveyance path merges with the first conveyance path;
counting a second convergence number of packages present in a second convergence monitoring section that is determined in the second conveyance path upstream the first junction;
determining an order in which packages in the first convergence monitoring section and packages in the second convergence monitoring section pass the first junction, based on the first number and the second number; and
controlling the first and second conveyance paths, such that the packages pass the first junction in the determined order.

17. The computer readable medium according to claim 16, wherein the process further comprises:
determining a leading one of one or more packages in the first convergence monitoring section to pass the first junction first, when the first number is greater than the second number; and
determining a leading one of one or more packages in the second convergence monitoring section to pass the first junction first, when the second number is greater than the first number.

18. The computer readable medium according to claim 16, wherein the process further comprises:
determining the first convergence monitoring section with a first predetermined length upstream from a leading package in the first conveyance path for which the order has not been determined; and
determining the second convergence monitoring section with a second predetermined length upstream from a leading package in the second conveyance path for which the order has not been determined.

19. The computer readable medium according to claim 18, wherein the first predetermined length is equal to the second predetermined length.

20. The computer readable medium according to claim 16, wherein
the first conveyance path includes a first buffer mechanism at upstream of the first junction,
the second conveyance path includes a second buffer mechanism at upstream of the first junction, and
the process further comprises:
determining the first convergence monitoring section with the first predetermined length upstream from a leading package on the first buffer mechanism for which the order has not been determined; and determining the second convergence monitoring section with the second predetermined length upstream from a leading package on the second buffer mechanism for which the order has not been determined.

\* \* \* \* \*